United States Patent

Highberger

[15] 3,643,810
[45] Feb. 22, 1972

[54] DEVICE FOR CARRYING AND SECURING SKI EQUIPMENT

[72] Inventor: Samuel M. Highberger, 5543 Westwood Lane, Birmingham, Mich. 48010

[22] Filed: Dec. 17, 1970

[21] Appl. No.: 99,173

Related U.S. Application Data

[62] Division of Ser. No. 744,197, July 11, 1968, Pat. No. 3,568,902.

[52] U.S. Cl. .......................................211/60 SK, 224/45 S
[51] Int. Cl. .......................................................A47f 7/00
[58] Field of Search.....................224/45 S, 5 Z, 45 R, 46 R, 224/52, 56, 45 P, 42.1 F, 42.1 E; 211/60 SK

[56] References Cited

UNITED STATES PATENTS

| | | | |
|---|---|---|---|
| 3,260,430 | 7/1966 | Sandenburgh | 224/45 |
| 3,307,759 | 3/1967 | Fulton | 224/45 |
| 3,504,405 | 4/1970 | Elliott-Smith | 224/45 |
| 2,133,883 | 10/1938 | Aubert | 211/60 SK |

Primary Examiner—Gerald M. Forlenza
Assistant Examiner—Jerold M. Forsberg
Attorney—Barnard, McGlynn & Reising

[57] ABSTRACT

A device for use in carrying and securing ski equipment including a U-shaped member and a hinged member that is lockable with respect to the U-shaped member after the U-shaped member and hinged member are positioned around a pair of skis that are disposed in back-to-back relationship. The device also includes a pivotable member for locking ski poles into a fixed position, the pivotable member being positioned so that a single locking plunger can tie together the U-shaped member, the hinged member, and the pivotable member thereby adapting the device to be carried or alternatively secured to a fixed object.

12 Claims, 16 Drawing Figures

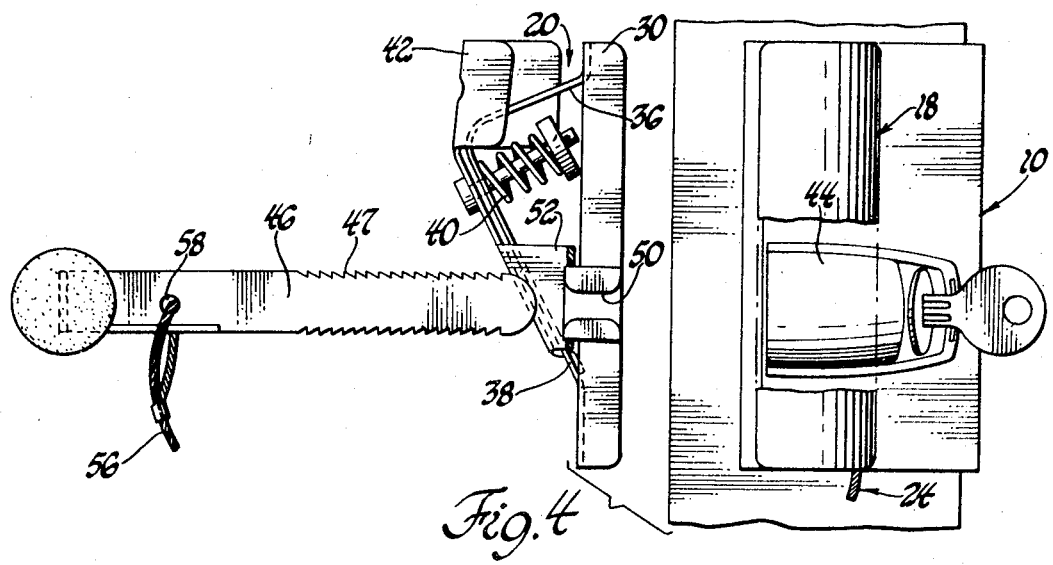
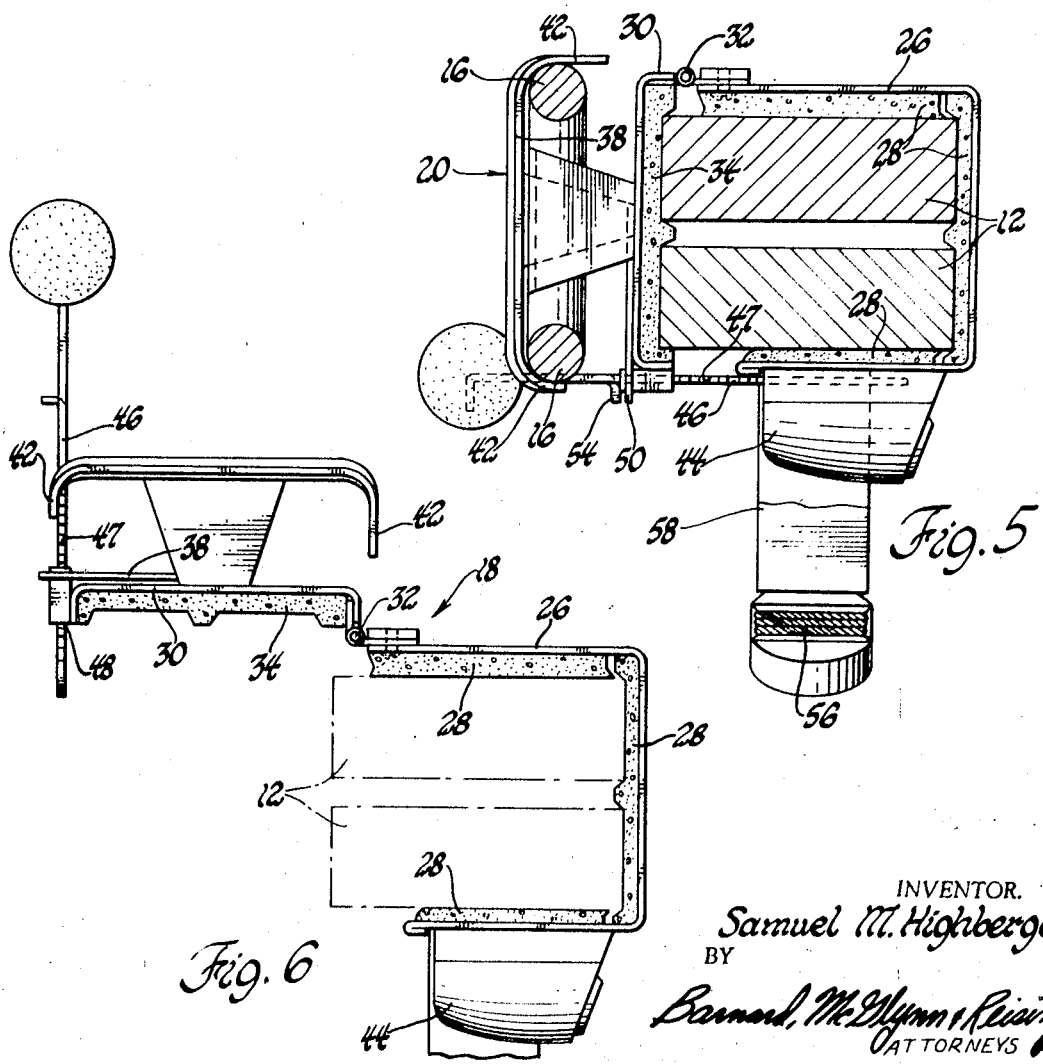

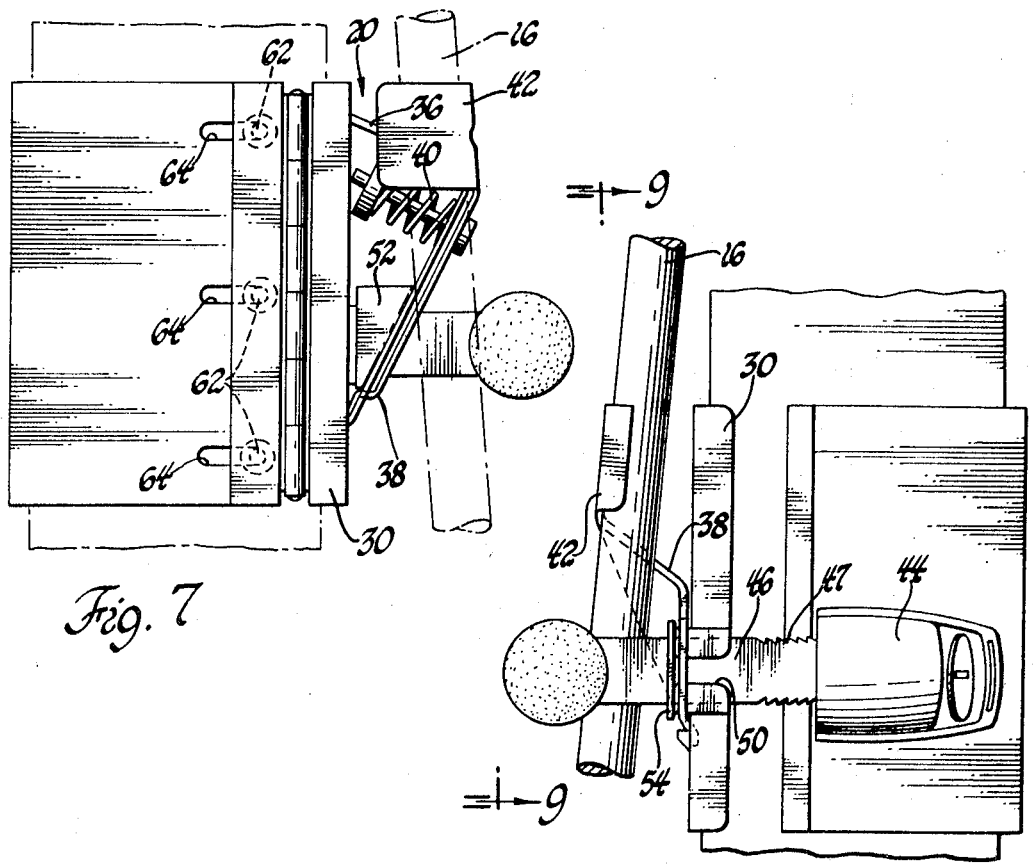
Fig. 7
Fig. 8
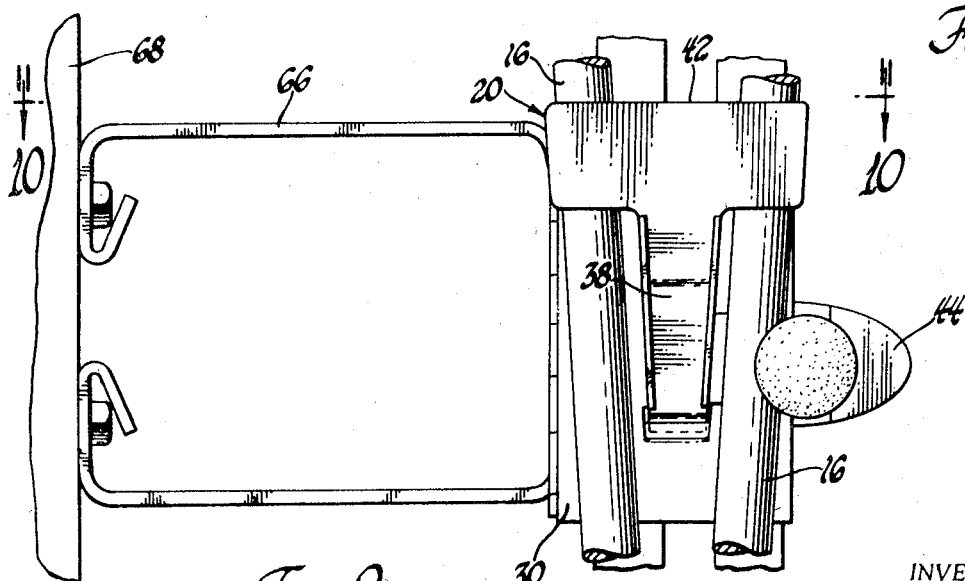
Fig. 9

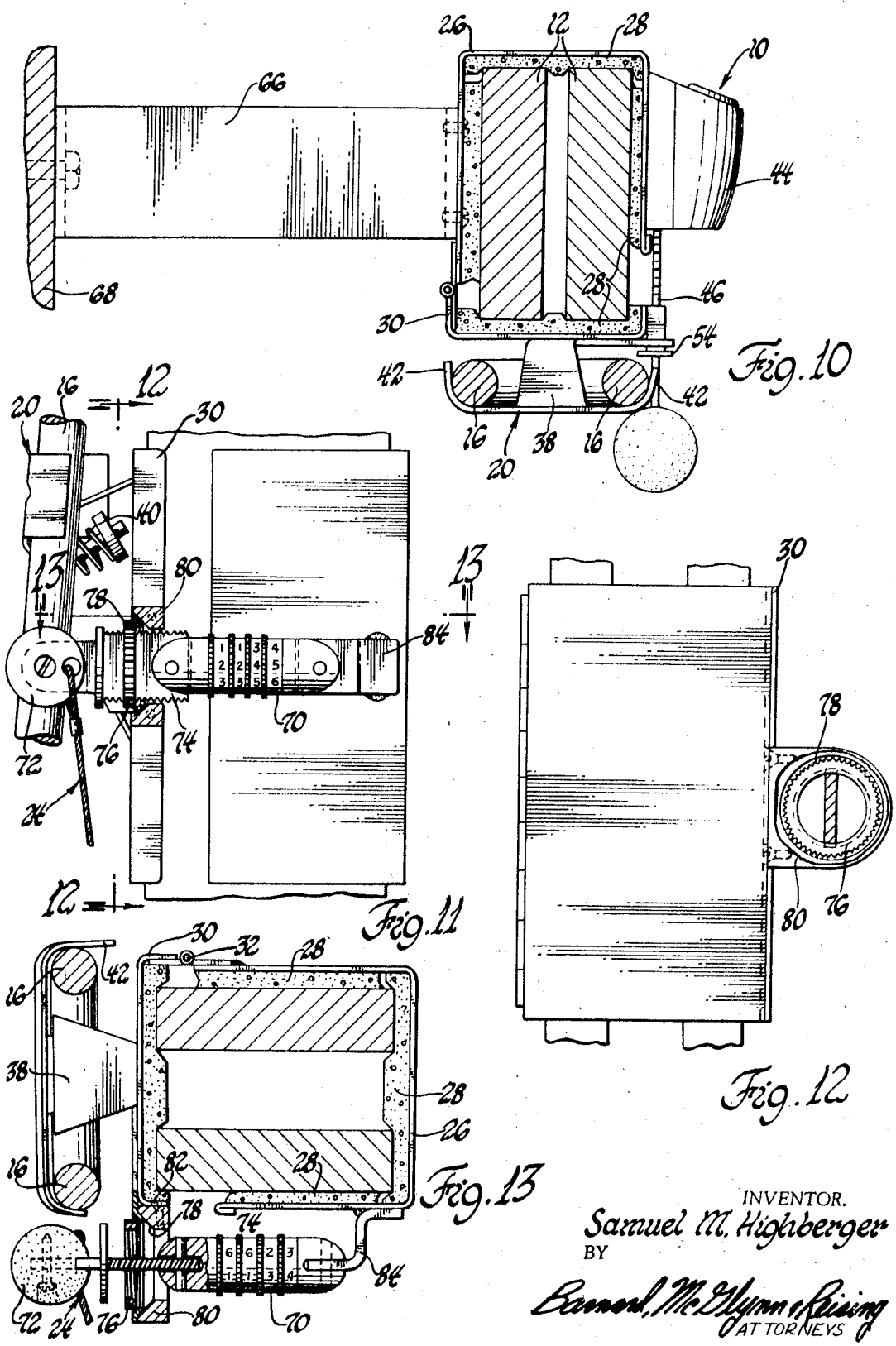

INVENTOR.
Samuel M. Highberger
BY
Bernard, McGlynn & Reising
ATTORNEYS

DEVICE FOR CARRYING AND SECURING SKI EQUIPMENT

This application is a divisional application of U.S. Ser. No. 744,197 filed July 11, 1968 now U.S. Pat. No. 3,568,902.

The present invention relates to ski apparatus, and more particularly to a device for use in carrying and securing ski equipment.

Ski equipment is ordinarily rather expensive and additionally is of a bulky and unwieldy nature. Therefore, it is desirable for those participating in the sport of skiing to be able to guarantee the security of their expensive ski equipment, as well as being provided with means for carrying the unwieldy skis and ski poles from one point to another. These needs are brought into sharp focus when it is understood that skiing is generally carried on at a mountain resort which is normally some distance from the skier's home. Therefore, the skis must be transported on a vehicle to the mountain resort where the skiing takes place. The resorts are generally crowded, and the vehicle used to transport the ski equipment to the resort is usually parked a great distance from the place where the skiing takes place. Consequently, it is necessary that the unwieldy skis, sometimes as long as 7 feet, and a pair of ski poles be transported from the vehicle to the point where the skiing takes place.

The other problem, above-mentioned, relative to the securement of the ski equipment, is also a very common problem experienced by skiers. Usually after a skier takes several trips down the ski slopes, a rest is needed and because of the normally low temperatures associated with the sport of skiing, this rest takes place within a ski lodge. This necessitates the skier removing the skis and placing them in a convenient place near the outside of the lodge. Due to the great expense of ski equipment, it is desirable that some means be provided that will prevent the unauthorized removal of the skis by unknown persons. Most ideally, the device that is used for carrying the skis and ski poles is combined with the security device so that the skier is presented with the minimum amount of paraphenalia.

Generally speaking, the prior art has not been responsive to the above-mentioned need of a skier in that only separate devices have been provided for carrying skis and for securing skis in such a manner that they cannot be unauthorizedly taken. Further, the types of devices shown in the prior art for locking skis or securing them in some manner are not of the character that would readily permit adapting the same device to be used for carrying the skis from one point to another. In other words, a typical means shown in the art for securing ski poles to a pair of skis is by placing some kind of cable or chain through the handle loops of the ski poles and passing the loop also around a fixed object such as a tree. This means that the pair of skis normally are held in juxtaposition but the ski poles are loose with respect to the skis. Therefore, this type of device cannot be readily used to carry the skis and ski poles in that they are not fixed with respect to one another.

Other prior art devices present ski equipment carriers wherein the skis and ski poles are fixed with respect to one another but the devices are of such a type that they are not adaptable for being locked or secured in some manner. Therefore, the state of the prior art is such that ski equipment carriers and ski security devices have not been combined into a convenient device with a dual purpose.

The subject invention contemplates the solution to the aforementioned problems by providing a device for use in carrying and securing ski equipment comprising first means for holding a pair of skis in fixed relation with respect to one another, second means attachable to the first means for holding a pair of ski poles in fixed relation with respect to one another and with respect to the pair of skis, third means for interlocking the first and second means, and fourth means engaging the first means for securing the first, second and third means to an immovable object. The device as above described, includes a handle for manually transporting the device and ski equipment attached thereto from place to place. More specifically, the device includes a substantially U-shaped member for receiving a plurality of skis and a closure member hinged with respect to the U-shaped member for moving into engagement with the skis and being interlockable with the U-shaped member to hold the skis in fixed relation with respect to one another. The ski pole holder includes an element pivotally supported by the closure member and biased with respect thereto, the element having a plurality of curved portions adapted to engage the shaft of the ski poles. A locking means is then provided which passes through aligned apertures in the U-shaped member, the closure member, and the element holding the ski poles, the locking means including a plunger of elongated form and a lock member adapted to receive the plunger in several axial positions so that the apparatus is adapted to maintain different dimensioned skis in a relatively fixed and secured condition.

Accordingly, it is an object of the present invention to provide an improved device for use in carrying and securing ski equipment comprising means for securing skis and ski poles together to a relatively immovable object and for holding the ski and ski poles fixed with respect to one another, and means adapted to allow manual transportation of the skis and ski poles while they are held fixed together and out of securement with respect to a relatively immovable object.

It is another object of the present invention to provide an improved device of the type described in the previous object wherein a portion of the means for securing skis and ski poles together is inactivated and secured to the last-mentioned means when the ski equipment is being manually transported from place to place.

It is a further object of the present invention to provide an improved device for use in carrying and securing ski equipment comprising first means for holding a pair of skis in fixed relation with respect to one another, second means attachable to the first means for holding a pair of ski poles in fixed relation with respect to one another and with respect to a pair of skis, third means for interlocking the first and second means, and fourth means engaging the first means for securing the first, second and third means to an immovable object.

It is still a further object of the present invention to provide an improved device according to the previous object wherein the first means includes a handle for manually transporting the device and ski equipment attached thereto.

Other objects and attendant advantages of the present invention will be readily appreciated as the same becomes better understood by reference to the following detailed description when considered in connection with the accompanying drawings wherein:

FIG. 4 is a view similar to FIG. 2 but with the device shown in the unlocked position;

FIg. 5 is a sectional view taken along line 5—5 of FIG. 2 with the device shown in the locked position;

FIG. 6 is a sectional view taken along line 5—5 of FIG. 2 but with the device shown in the unlocked position;

FIG. 7 is a side elevational view of the subject device illustrating the adjustment feature;

FIG. 8 is an elevational view of a modification of the ski pole holding mechanism;

FIG. 9 is an elevational view of the device of FIG. 1 but modified for use in a permanent installation;

FIG. 10 is a sectional view taken along line 10—10 of FIG. 9;

FIG. 11 is a side elevational view of another modification of the subject device shown utilizing a combination lock;

FIG. 12 is a sectional view taken along lines 12—12 of FIG. 11;

FIG. 13 is a sectional view taken along lines 13—13 of FIG. 11;

Figures 1, 2, 3:
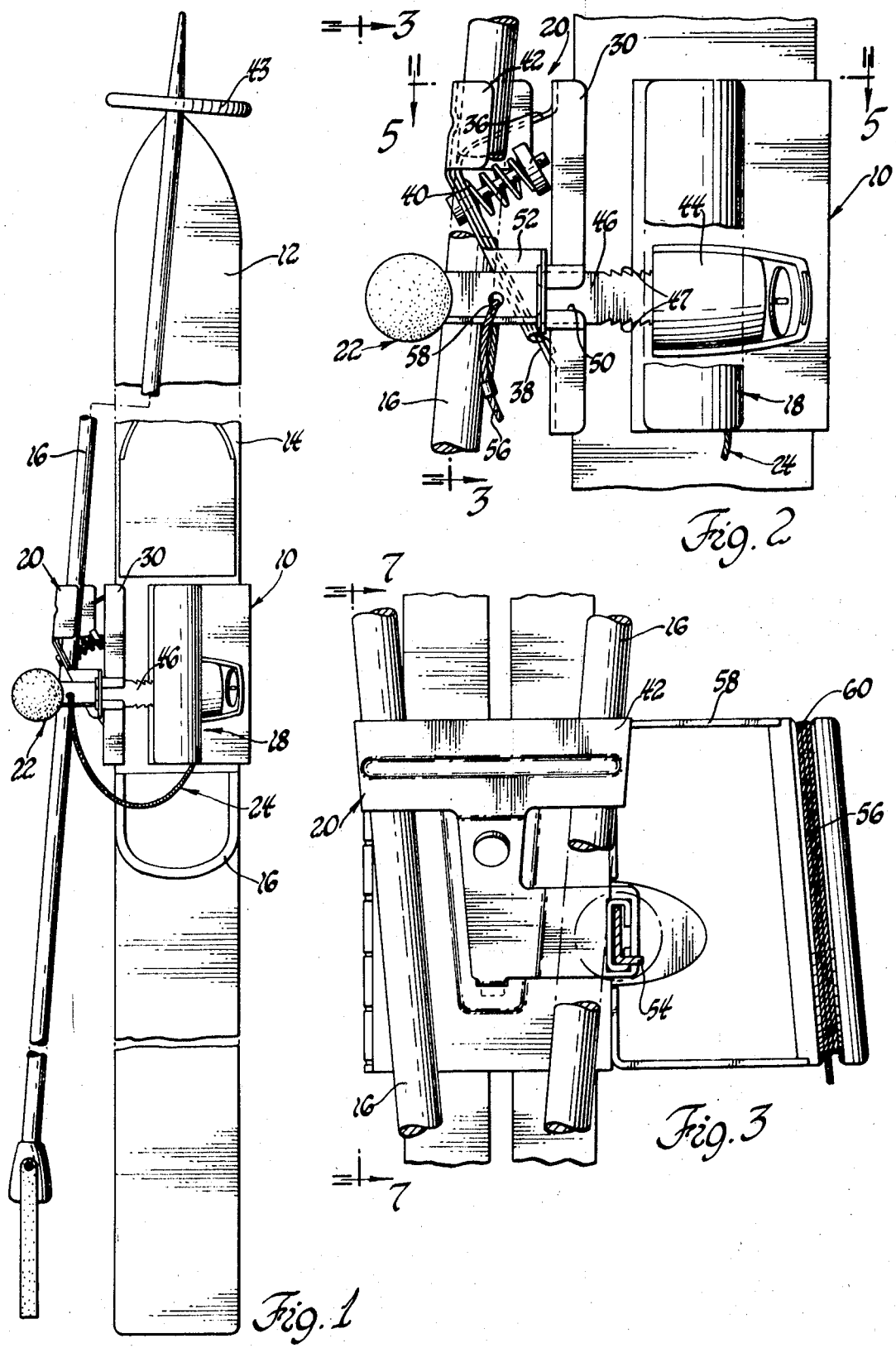
FIG. 1 is a view in elevation of the subject device shown in its operative environment.
FIG. 2 is a view in increased scale of the device shown in FIG. 1.
FIG. 3 is a sectional view taken along line 3—3 of FIG. 2.

Referring to FIG. 1, a device, generally designated by numeral 10, is designed for use in carrying and securing ski equipment. Device 10 is attached to a pair of skis, in a manner to be hereinafter described, which are disposed in back-to-back relationship. The device engages the skis at a point between portions 14 and 16 of a binding diagrammatically shown, it being understood that any type binding can be used. This prevents device 10, when assembled, from being casually slid off either end of skis 12.

Referring to FIG. 1, a first means generally designated by numeral 18 is utilized for holding a pair of skis in fixed relation with respect to one another. Second means, generally designated by numeral 20, is attachable to first means 18 for holding a pair of ski poles 16 and 15 in fixed relation with respect to one another and with respect to the pair of skis. Third means, designated by numeral 22, interlocks first means 18 and second means 20. Fourth means, generally designated by numeral 24, engages first means 18 for securing the first, second and third means to an immovable object such as a tree.

First means 18, as seen in FIG. 6, generally comprises a substantially U-shaped member 26 for receiving a plurality of skis 12. U-shaped member 26 has padded material 28 attached to an inside portion thereof in any well known manner and is designed to prevent damage to the exterior finish of the skis. Closure member 30, hinged at 32, is moved into engagement with skis 12 and is interlockable with U-shaped member 26, in a manner to be hereinafter described, to hold skis 12 in fixed relation with respect to one another. Closure member 30 also has padding 34 fixed thereto in any well known manner similar to padding 28. In FIG. 6, closure member 30 is shown pivoted away from U-shaped member 26 such as would be the configuration as skis 12 are inserted originally into the device 10.

Referring to FIG. 2, second means 20 is seen as comprising an angled bracket 36, affixed to closure member 30 in any well-known fashion such as by welding. A similarly angled bracket 38 passes through an aperture in closure member 30 and is pivoted therein and is biased into engagement with angled bracket 36 by spring arrangement 40. Therefore, as designed, bracket 38 is disposed so that it is biased toward angled bracket 36 because of the bias of spring 40. Bracket 38 has a plurality of curved portions 42 integrally formed therewith, best seen in FIG. 5. Portions 42 are adapted to engage the outer periphery of the shafts of ski poles so that when the baskets 43 of the ski poles are hooked over the tip of skis 12, the angular disposition is such that the shafts of ski poles 16 are held under tension by spring 40 against device 10. It is understood that as the ski pole 16 extends from the tip of the ski, one portion of each of the poles will come into engagement with the edge of the ski as the ski poles extend past the side of the ski toward the second means 20. Therefore, depending on the length of the ski pole and the length of the skis, the combination of the two determines the exact position of device 10; spring 40 will take up any lost motion therebetween resulting in the ski poles 16 being fixed with respect to one another and fixed with respect to skis 12.

Referring to FIG. 2, third means 22 is provided for interlocking first means 18 and second means 20. In the embodiment of FIGS. 1–9, third means 22 generally comprises a "-Travel Lock" carried by U-shaped member 26 as best seen in FIGS. 2 and 6 and designated by numeral 44. Lock 44 includes an elongated plunger 46 having serrations 47 on exterior edges thereof, adapting a ratchetlike connection of plunger 46 to the tumblers in lock 44.

Referring to FIG. 5, plunger 46 passes through aligned aperture 48 in closure member 30 and aperture 50 formed in flange 52 of bracket 38. Plunger 46 includes a stop member 54 so that when plunger 46 passes through apertures 54 and 50 and into lock 44, stop 54 engages the outside surface of flange 52 in which aperture 50 is disposed causing closure member 30, U-shaped member 26 and bracket 38 to be interlocked. In other words, third means 22 interlocks first means 18 and second means 20 so that the release of plunger 46 from lock 44 can be effected only by possession of the particular key suited to lock 44.

Referring to FIG. 2, fourth means generally designated by the numeral 24 includes an elongated element 56 shown herein in the form of a cable, but it is understood that the elongated element can take any form such as a chain that is adapted to engage plunger 46 at one end as seen at 58 and secured at the other end to U-shaped member 26 in similar fashion. Element 56 is adapted to be passed around an immovable object, such as a tree or a portion of a vehicle, to prevent the casual disassociation of device 10 and ski equipment attached thereto from the object.

Referring to FIG. 3, a handle 58 is integrally formed with or attached to U-shaped member 26 in any well-known fashion. Handle 58 has a reel portion 60 integrally formed therewith that is adapted to have element 56 wrapped therearound while the device is being transported. Elongated element 56 would otherwise be hanging free, tending to become entangled with the ski poles or associated mechanism.

The operation of the subject device is best illustrated by referring to FIG. 6. Skis 12 are placed in back-to-back relationship and are compressed against their natural camber so as to be nonslidably held in U-shaped member 26. When the skis 12 are positioned against padding 28, closure member 30 is swung on hinge pivot 32 to the position shown in FIG. 5. Bracket 38, of second means 20, is pulled back against the tension of spring 40, and ski poles 16 are inserted into the position shown in FIGS. 1 and 5, it being understood that the baskets 34, thereof are hooked over the tip of the skis 12. With ski poles 16 positioned as seen in FIG. 5, plunger 46, which is freely slidable in aperture 48, is pushed through aperture 50 aligned with aperture 48 so that plunger 46 comes into registry with a complementary shaped aperture in lock 44. This relationship is best seen in FIG. 2. When stop 54 comes into engagement with flange 52 of bracket 38, serrated surfaces 47 are interlocked in lock 44 and plunger 46 can no longer be withdrawn. It is understood that before plunger 46 is inserted into aperture 48, element 56 attached thereto has been passed around a tree or some other immovable object and when plunger 46 is therefore seated in lock 44, device 10 cannot be casually disassociated from the fixed object. Therefore, a security mechanism is provided.

When the skis and ski poles, so assembled, are to be transported from place to place, elongated element 56 is merely wrapped on reel 60 leaving a sufficient length available to allow insertion of plunger 46 into apertures 48 and 50 as previously described so that plunger 46 holds the ski poles and skis in assembled disposition. Thereafter, the device 10 is free to be carried by means of handle 58 and the transporting capabilities are thereby realized.

Referring to FIG. 7, an adjustment is provided for closure member 30 so that different width skis can be easily accommodated. Hinged closure 30 has apertures through which fastening members 62 extend and cooperate with slot 64 in U-shaped member 26 allowing closure member 30 to slide to different adjusted positions relative to U-shaped member 26. This difference in dimension is accommodated on the opposite side of closure member 30 by serrated portions of plunger 46 so that the plunger can be held in several axial positions with respect to lock 44.

Referring to FIG. 10, another modification of the fourth means 24 of the device shown in FIG. 1 is illustrated. Whereas the fourth means was formerly designated as numeral 24, herein it takes the form of bracket 66, secured at one end to a building 68 or some other relatively fixed object and on an opposite end to U-shaped member 26. This modification of the subject invention allows the device 10 to be permanently located such as would be required for rental purposes at a ski resort, allowing the mechanism the same securement allowed when the elongated element 56 is passed around an immovable object. Of course, in the embodiment of FIG. 10, device 10 is not capable of being transported without being first detached from wall 68.

Referring to FIG. 11, another embodiment of the subject invention as shown, and it is understood that where parts similar to those shown for the first embodiment are illustrated, similar reference numerals will be applied. In this embodiment, lock 44 of third means 22 takes the form of a combination lock 70. Plunger 72 is insertable into the combination lock 70 but can be seated therein in only one axial position. Therefore, the adjustment means set forth at 62, 64 and 47 is accommodated by a threaded exterior portion 74 of plunger 72, cooperating with knurled nut 76 acting against frustoconical opening 78 in element 80 attached to closure member 30 in any well-known fashion, such as by screws 82 seen in FIG. 13. Portion 74 of plunger 72 is not threaded completely to one end thereby preventing nut 76 from being turned off completely. Bracket 38 of second means 20 also has an aperture 48 in similar fashion to that of the first embodiment. Therefore, plunger 72 aligns with aperture 48 as previously described. However, in the present embodiment, bracket 38 fits in front of knurled nut 76 and when plunger 72 seats in combination lock 70, some play may exist between nut 76 and the outside surface of bracket 38. When this occurs, knurled nut 76 is merely threaded further on threaded portion 74 of plunger 72 until the nut seats against bracket 38 holding the second means at adjusted engagement with respect to first means 18.

As seen in FIG. 13, the extension of curved portions 42 is such that if the knurled nut 76 is loosened, a certain amount of play can be brought about in second means 20, but the shafts of ski poles 16 are sufficiently large to prevent their withdrawal from the space that would be generated between curved portions 42 and closure member 30. This effectively prevents the unauthorized withdrawal of the ski poles from their locked position.

Bracket 84 is fixed to a U-shaped member 26 in any well known manner and extends outwardly to allow clearance for the rotation of the dials in the combination lock 70. It is obvious then that the bracket 38 of the ski pole lock assembly, or second means 20, must be longer than that shown in the first embodiment in order for the aperture 48 to line up with opening 78 and combination lock 70. Preferably, the combination lock 70 is fixed with respect to bracket 84 and extends proportionally into opening 78 to guarantee registry thereof with plunger 72. In much the same manner as described for the first embodiment, the elongated element 56 is attached in any well-known fashion to the U-shaped member 26 and to plunger 72 as shown in FIG. 11. This allows the engagement of the elongated element 56 around a fixed object such as a tree to insure the security of the device shown in FIG. 11. Likewise in this embodiment, handle 58 is provided on U-shaped member 26 to effect the transportation of the device along with the skis and ski poles from place to place, and the reel 60 is again provided for wrap-up of the elongated element 56 while transportation is taking place.

Figure 14:
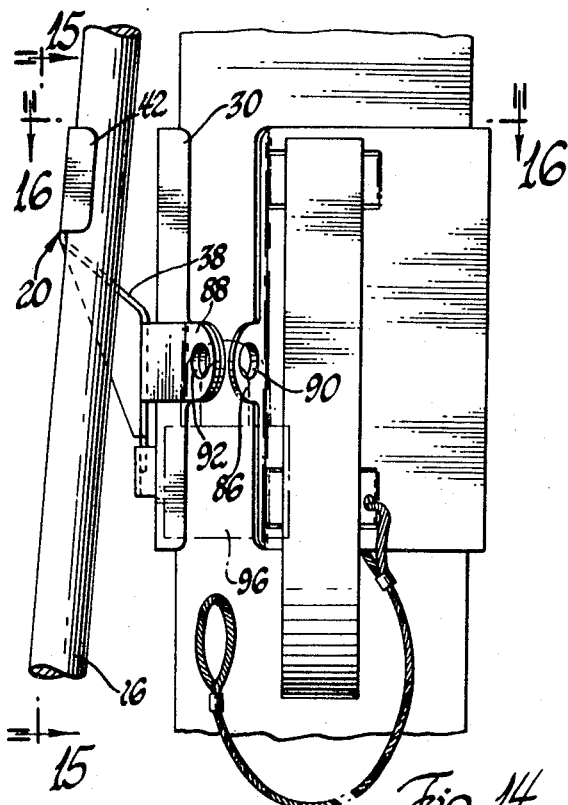
FIG. 14 is an elevational view of another embodiment of the subject device.
Figure 15:
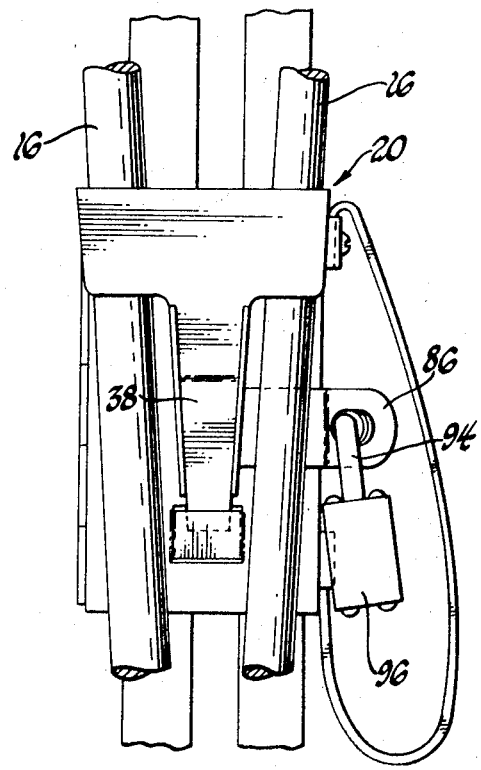
FIG. 15 is a view taken in the direction of the arrows 15—15 of FIG. 14.
Figure 16:
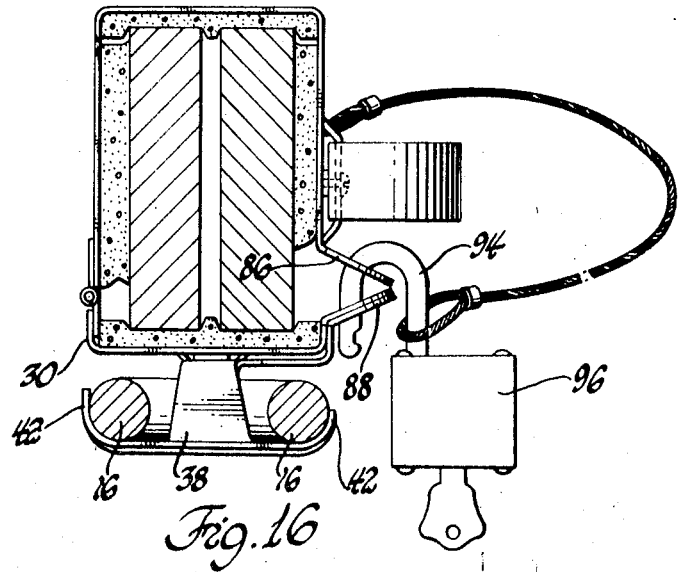
FIG. 16 is a sectional view taken along lines 16—16 of FIG. 14.

Another embodiment of the present invention is illustrated in FIGS 14, 15 and 16. The basic difference between this embodiment and the previous embodiments is in the use of an ordinary padlock, replacing the "Travel Lock" 44 of the first embodiment and combination lock 70 of the second embodiment. Referring to FIG. 16, flange 86 extends from U-shaped member 26 and is angularly disposed with respect to the outer portion of the U-shaped member 26. Bracket 38, of second means 20, takes the form of a similar but oppositely angled member 88. As best seen in FIG. 14, apertures 90 and 92 respectively are aligned so that locking bar 94 of lock 96 engages both apertures simultaneously. When the adjusting means shown in FIG. 7 is used, proper closure of closure member 30 is effected by bending either member 88 or flange 86 so that lock 96 maintains a tight engagement. First means 18, second means 20 and fourth means 24 take the same form as that shown in the previous embodiment, so will not be further discussed.

It should be understood that whereas the three embodiments of the subject invention are shown as being adapted to be carried from one place to another, it should be understood that the embodiment of the fourth means shown in FIG. 9 can be readily adapted to be used with any of the locking assemblies shown so that various locking arrangements can be used in a stationary environment also. It should further be noted that in FIG. 8 is shown a simplified second means in that the spring has been eliminated, and bracket 38 is merely held between stop 54, of slightly modified form, and closure member 30.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. A device for securing ski equipment comprising: a ski clamp for holding a pair of skis including a plurality of pivotally connected ski clamp members pivotal relative to each other between an open position to permit insertion of a pair of skis between said members and a closed position in which the skis are secured together and held by said members against removal from between said members; a ski pole clamping member mounted on one of said plurality of ski clamp members for pivotal movement with respect to said one ski clamp member between an open position to permit ski poles to be inserted between said ski pole clamping member and the outer surface of said one ski clamp member, and a ski pole clamping position to secure the ski poles in a position located between said ski pole clamping member and the outer surface of said one ski clamp member; and locking member engaging elements on said ski clamp and ski pole clamping member movable into locking member engaging relationship when said ski clamp members are in the closed position and said ski pole clamping member is in its ski pole clamping position to be engaged by a locking member to lock said ski clamp members against movement from the closed position and said ski pole clamping member against movement from the ski pole clamping position.

2. A device as claimed in claim 1 further including securing means carried by said ski clamp for securing said ski clamp to a relatively immovable object.

3. A device as claimed in claim 2 wherein said securing means comprises an elongated flexible member having one end secured to said ski clamp.

4. A device as claimed in claim 3 further including a locking member carried by the free end of said elongated flexible member, said locking member being engageable with said locking member engaging elements on said ski clamp and ski pole clamping means.

5. A device as claimed in claim 4 wherein said locking member comprises a plunger and said locking member engaging elements are apertured for receiving said plunger, and further including a lock carried by another of said ski clamp members for receiving said plunger when it is inserted through said apertures and locking said plunger against withdrawal.

6. A device as claimed in claim 5 further including a reel portion carried by said ski clamp around which the elongated flexible member can be wrapped for storage and transport.

7. A device as claimed in claim 2 wherein said securing means comprises a mounting bracket for attaching said ski clamp to a relatively immovable object.

8. A device as claimed in claim 1 wherein said ski clamp members include a U-shaped member and said one ski clamp member comprises a closure member hinged to one leg of said U-shaped member and extending across the space between the free end of the legs of the U-shaped member in the closed position.

9. A device as claimed in claim 8 further including a support bracket mounted on said closure member, said ski pole clamping member being pivotally mounted on said support bracket for movement between a position pivoted out of engagement with said support bracket to define the open position of said ski pole clamping member and a position seated against said support bracket to define the closed position thereof.

10. A device as claimed in claim 9 further including a spring interconnected between said support bracket and said ski pole clamping member biasing said ski pole clamping member toward the closed position.

11. A device as claimed in claim 10 wherein said ski pole clamping member includes a pair of curved ski pole receiving portions each operable to confine a ski pole against the outer surface of said closure member in the closed position of said ski pole clamping means.

12. A device as claimed in claim 8 wherein said closure member is adjustably secured to said one leg of said U-shaped member to accommodate skis of different sizes.

* * * * *